(12) United States Patent
Sharp

(10) Patent No.: US 11,789,145 B2
(45) Date of Patent: Oct. 17, 2023

(54) METHOD AND APPARATUS FOR DETECTING AT LEAST PARTIAL FLOODING OF A MOTOR VEHICLE

(71) Applicant: Robert Bosch GmbH, Stuttgart (DE)

(72) Inventor: Jesse Sharp, Caulfield North (AU)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 17/621,768

(22) PCT Filed: Jun. 9, 2020

(86) PCT No.: PCT/EP2020/065954
§ 371 (c)(1),
(2) Date: Dec. 22, 2021

(87) PCT Pub. No.: WO2021/018451
PCT Pub. Date: Feb. 4, 2021

(65) Prior Publication Data
US 2022/0357444 A1 Nov. 10, 2022

(30) Foreign Application Priority Data
Jul. 26, 2019 (DE) ...................... 10 2019 211 188.2

(51) Int. Cl.
*G01S 15/88* (2006.01)
*B60Q 9/00* (2006.01)
(Continued)

(52) U.S. Cl.
CPC ................ *G01S 15/88* (2013.01); *B60Q 9/00* (2013.01); *B60R 21/01* (2013.01); *B60R 2021/0016* (2013.01)

(58) Field of Classification Search
CPC .. G01S 15/88; G01S 2015/938; G01S 15/931; B60Q 9/00; B60R 21/01; B60R 2021/0016
See application file for complete search history.

(56) References Cited

U.S. PATENT DOCUMENTS 9,821,659 B2 * 11/2017 Tran ........................ G10K 13/00
10,414,235 B1 * 9/2019 Yassan .................... G01S 7/539

FOREIGN PATENT DOCUMENTS

| DE | 3937585 A1 | 5/1991 |
|---|---|---|
| DE | 102009060190 A1 | 6/2011 |

(Continued)

OTHER PUBLICATIONS

International Search Report for PCT/EP2020/065954, dated Aug. 28, 2020.

*Primary Examiner* — Omeed Alizada
(74) *Attorney, Agent, or Firm* — NORTON ROSE FULBRIGHT US LLP; Gerard Messina

(57) ABSTRACT

A device for the detection of an at least partial flooding of a motor vehicle. The device includes an ultrasonic sensor that is designed to transmit and to receive ultrasonic signals. The device also includes an electronic recognition device, which can recognize an at least partial flooding of the motor vehicle on the basis of an ultrasonic signal received by the ultrasonic sensor. The recognition device is designed to determine the amplitudes of ultrasonic signals received within a defined time window, and to compare the amplitudes to a defined threshold value. The recognition device is designed to detect a flooding of the ultrasonic sensor as a function of the result of the comparison.

17 Claims, 3 Drawing Sheets

(51) Int. Cl.
*B60R 21/01* (2006.01)
*B60R 21/00* (2006.01)

(56) References Cited

FOREIGN PATENT DOCUMENTS

DE 102012015764 A1 2/2014
EP 2813861 A1 12/2014

* cited by examiner

METHOD AND APPARATUS FOR DETECTING AT LEAST PARTIAL FLOODING OF A MOTOR VEHICLE

FIELD

The present invention relates to a device for detecting an at least partial flooding of a motor vehicle, having an ultrasonic sensor that has in particular a membrane having a front side via which the ultrasonic sensor sends out a transmit signal and receives a received signal, as well as having an electronic recognition device that can recognize the flooding of the motor vehicle on the basis of the received signal. The present invention also relates to a motor vehicle having such a device, and to a corresponding method.

BACKGROUND INFORMATION

Ultrasonic sensors are available in the related art in many embodiments. They are standardly used in parking assistance systems, and are usually used to acquire the surrounding environment of the motor vehicle. It is, for example, conventional to use such an ultrasonic sensor to measure the distances between the motor vehicle and the obstacles situated in its environment. Here, the ultrasonic sensor sends out a transmit signal that is reflected by an object in the surrounding environment of the motor vehicle and travels back to the ultrasonic sensor in the form of an echo, or received signal. The distance to the object is then determined on the basis of the runtime of the signal.

It is also conventional in the related art to use an ultrasonic sensor to recognize a flooding of a motor vehicle. Such a flooding recognition system is described in German Patent Application No. DE 10 2009 060 190 A1. Here, the flooding is recognized by evaluating the oscillation properties of the ultrasonic sensor. The receive signal received by the ultrasonic sensor is evaluated and is compared with a reference value, and as a function of this comparison it is determined whether the membrane of the sensor is at least partially flooded by water. For example, the decay time or the frequency is evaluated here.

In such flooding recognition systems, it is sought to place the ultrasonic sensor so far towards the bottom, or so far down, on the motor vehicle that a flooding can be recognized particularly quickly even when the water has not yet penetrated into the engine compartment of the motor vehicle. However, a situation of the ultrasonic sensor in the engine compartment, or too far down on the motor vehicle, has the disadvantage that objects are then situated in the near field of the ultrasonic sensor that cause echo signals very similar to those caused by flooding, so that the overall system cannot distinguish these two states from one another. In the related art, the flooding is recognized for example on the basis of the decay time of the membrane. In the flooded state, this decay time is significantly longer than it is in the absence of water. If the ultrasonic sensor is placed in the engine compartment, then a multiplicity of objects are situated close to the sensor that cause echo signals by which the decay time of the membrane is lengthened, which could be wrongly interpreted by the system as a flooding.

SUMMARY

An object of the present invention is to provide a solution enabling a reliable and simple flooding recognition.

This object may be achieved by a device, by a motor vehicle, and by a method having the features according to the present invention. Advantageous embodiments are disclosed herein.

A device according to an example embodiment of the present invention is designed for the detection of an at least partial flooding of a motor vehicle, and includes an ultrasonic sensor that is designed to transmit and to receive ultrasonic signals. The ultrasonic sensor has in particular a membrane having a front side via which the ultrasonic sensor sends out a transmit signal and receives a received signal. The device also includes an electronic recognition device, for example a microcontroller, that, on the basis of an ultrasonic signal received by the ultrasonic sensor, can recognize an at least partial flooding of the motor vehicle. According to an example embodiment of the present invention, the recognition device is designed to determine the amplitudes of ultrasonic signals received within a defined time window, and to compare these amplitudes with a defined threshold value. The recognition device is designed to detect a flooding of the ultrasonic sensor as a function of the result of the comparison.

Moreover, in accordance with an example embodiment of the present invention, a method is provided for detecting an at least partial flooding of a motor vehicle, in which ultrasonic signals are sent out and received by an ultrasonic sensor, and an electronic recognition device is used to detect a flooding of the ultrasonic sensor on the basis of at least one ultrasonic signal received by the ultrasonic sensor. According to the present invention, for this purpose an amplitude of at least one ultrasonic signal received within a defined time window is determined, the amplitude is compared with a defined threshold value, and a flooding of the ultrasonic sensor is detected as a function of the result of the comparison.

Preferably, here the amplitudes of at least two maxima of the received ultrasonic signal, received within a defined time window, are determined, the determined amplitudes are compared with a defined threshold value, and a flooding of the ultrasonic sensor is detected as a function of the result of the comparison. In particular, a flooding is detected if the amplitudes of two or more ultrasonic signals received within the defined time window are greater than the defined threshold value.

According to a further aspect of the present invention, a motor vehicle is proposed that has at least one device, realized according to the present invention, for detecting a flooding.

The present invention is based on the recognition that as soon as the membrane of a conventional ultrasonic sensor is flooded, after the transmission of an ultrasonic signal by this ultrasonic sensor within a defined time window characteristic ultrasonic signals are received. These have a characteristic amplitude that is in particular higher than a defined threshold value. In normal operation of the ultrasonic sensor, i.e., without flooding, given the propagation of sound in air received ultrasonic signals have comparatively high amplitudes in particular when they are reflected by flat, hard objects relatively close to the ultrasonic sensor, e.g., at a distance of less than one meter. Received ultrasonic signals theoretically have the highest amplitudes when they are reflected by a concave object whose radius of curvature corresponds to the distance of the object from the ultrasonic sensor. If the membrane of the ultrasonic sensor is underwater, one or more ultrasonic signals are received that can have amplitudes that are higher than this theoretically highest amplitude. Thus, if one or more ultrasonic signals that have such a high amplitude are received within a defined time window, this is an indicator that the ultrasonic sensor is flooded. Accordingly, as a defined threshold value a value can be defined that for example corresponds to an expected amplitude of a received ultrasonic signal that is reflected by a concave object whose radius of curvature corresponds to the distance of the object from the ultrasonic sensor.

In the sense of the present invention, an amplitude is for example to be understood as a maximum amplitude of a received acoustic signal. Thus, ultrasonic sensors that are standardly used for distance measurement on motor vehicles receive for example echo signals of ultrasonic signals that were previously sent out by the receiving ultrasonic sensor, or by another ultrasonic sensor, and were reflected by an object.

Here, for example a membrane of the ultrasonic sensor is set into oscillation. This oscillation can be converted into an electrical signal in a conventional manner by an electroacoustic transducer. In the sense of the present invention, an amplitude can be understood as a maximum amplitude of this electrical signal. A signal can also have a plurality of maxima having different amplitudes. Alternatively or in addition, an envelope curve of the oscillating electrical signal can be determined. An amplitude can be understood as a local or global maximum of such an envelope curve.

An advantage of the device according to the present invention, and of the method according to the present invention, is in particular that conventional ultrasonic sensors can be used for the flooding recognition. In addition, the determination according to the present invention of the amplitudes of ultrasonic signals received within a defined time window, and the comparison of these amplitudes with a defined threshold value, yields a result that cannot be confused with contamination or some other kind of blockage of the ultrasonic sensor.

In a preferred embodiment of the present invention, the amplitudes of at least two ultrasonic signals received within a defined time window are determined, and these amplitudes are compared with a defined threshold value. As a function of the result of the comparison, a flooding is detected when the amplitudes of two or more ultrasonic signals received within the defined time window are greater than the defined threshold value.

Preferably, the defined threshold value corresponds to a maximum expected amplitude of a received ultrasonic signal that can be received by the ultrasonic sensor when there is a measurement in air. This can correspond for example to an expected amplitude of a received ultrasonic signal that is reflected by a concave object whose curvature radius corresponds to the distance of the object from the ultrasonic sensor. The defined threshold value is in particular a function of the distance to the object, or of the signal runtime.

Preferably, the defined time window within which the ultrasonic signals are received and compared with the defined threshold value is selected such that it corresponds to a runtime of an ultrasonic signal of the ultrasonic sensor that, given a measurement in air, corresponds to an object distance of less than 1 meter, in particular an object distance between 30 cm and 50 cm.

In a preferred embodiment of the present invention, the ultrasonic sensor is realized as part of an environmental acquisition system of the motor vehicle. This can for example be a part of a parking assistance system. Standard environmental acquisition systems of this type have a plurality of ultrasonic sensors that are situated for example in the bumper of a motor vehicle. This is advantageous because on the one hand no additional sensors have to be used for the detection of a flooding of a motor vehicle; rather, ultrasonic sensors already present can be used in a manner that saves costs and material. In addition, the situation on a bumper is advantageous because flooding to this level usually does not yet result in damage to the motor vehicle.

If an at least partial flooding is detected by a device according to the present invention, or by a method according to the present invention, a warning signal can preferably be produced. The warning signal can trigger a warning output to the driver of the motor vehicle, so that the driver is informed about the flooding and can introduce countermeasures as appropriate. Alternatively or in addition, the warning signal may trigger further protective measures of the motor vehicle against penetrating water.

Preferably, the environmental acquisition system can have a plurality of ultrasonic sensors that have in particular different heights of installation on the motor vehicle. In this case, the warning output can be produced in such a way that it is indicated to the driver of the motor vehicle, for example on a display, which of the ultrasonic sensors are flooded.

Alternatively or in addition, from the information about the different heights of installation of the ultrasonic sensors and from those ultrasonic sensors that detect a flooding, it can be calculated how deep in water the vehicle is. This information can be outputted to the driver and/or can be used by a driver assistance system.

BRIEF DESCRIPTION OF THE DRAWINGS

Specific embodiments of the present invention are now described in detail with reference to the figures.

DETAILED DESCRIPTION OF EXAMPLE EMBODIMENTS

Figure 1:
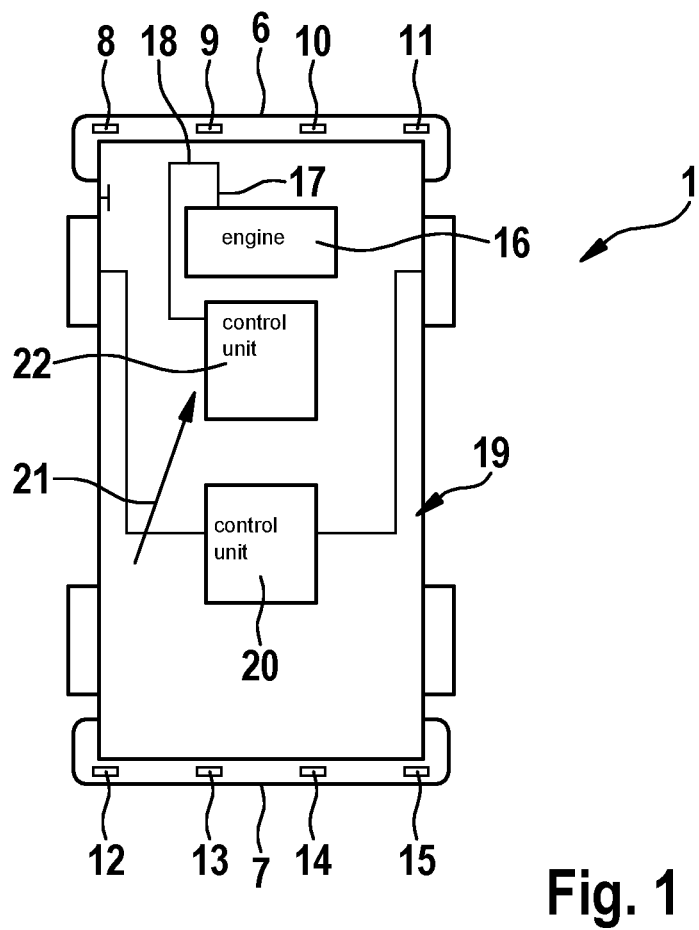
FIG. 1 shows a schematic plan view of a motor vehicle having an exemplary embodiment of a device according to the present invention for detecting an at least partial flooding.

In the following description of the exemplary embodiment of the present invention, identical elements are designated with identical reference characters, and a repeated description of these elements may be omitted. The Figures represent the subject matter of the present invention only schematically.

FIG. 1 shows, in a schematic plan view, a motor vehicle 1 made with two axles and two tracks. Motor vehicle 1 has on its front side a front bumper 6 and has on its rear side a rear bumper 7. In the exemplary embodiment, on rear bumper 6 there are situated four ultrasonic sensors 8, 9, 10, and 11 that are designed for environmental acquisition in the area in front of the motor vehicle. Analogously, ultrasonic sensors 12, 13, 14, and 15 are made in rear bumper 7. The number of ultrasonic sensors in bumper 6 and in bumper 7 can also be different from the depicted realization. Rear ultrasonic sensors 12 through 15 cover the area behind motor vehicle 1. With ultrasonic sensors 8, 11, 12, and 15, the region to the side of motor vehicle 1 can also be detected.

In addition, motor vehicle 1 includes an engine 16 having at least one air intake duct 17 in which there is situated a flap 18 for at least partial closure of air intake duct 17.

Motor vehicle 1 includes a parking assistance system 19 that has ultrasonic sensors 8 through 11 and 12 through 15, and in addition includes a control unit 20. As a function of the detected environmental information, parking assistance system 19 is designed to recognize a suitable parking space, and preferably also to carry out, in at least semi-autonomous fashion, a parking process for motor vehicle 1. In this connection, actuators of the steerable wheels are influenced by control unit 20.

In addition, motor vehicle 1 has a recognition device 21 that is designed for the detection of a motor vehicle 1 that is at least partially underwater. Recognition device 21 includes a control unit 22. In addition, at least one of the ultrasonic sensors 8 through 11 and/or at least one of the ultrasonic sensors 12 through 15 is functionally assigned to recognition device 21. Control unit 22 is designed to control the assigned ultrasonic sensor or sensors. In particular, it can be provided that a parking assistance system 19, that for example is already installed in the motor vehicle, can in addition also be used for flooding recognition. For this purpose, it can also be provided that only one unit 20 or 22 is present.

Recognition device 21 is designed in such a way that it recognizes, as a function of amplitudes of ultrasonic signals received during at least one measurement cycle, whether one or more of the ultrasonic sensors 8 through 15 assigned to recognition device 21 are situated in water or in air. Here, recognition device 21 is designed to determine the amplitude of at least one ultrasonic signal received within a defined time window by one of the ultrasonic sensors 8 through 15, and to compare the amplitude to a defined threshold value, and, as a function of the result of the comparison, to detect a flooding of the ultrasonic sensor. In order to recognize a flooding, e.g. with water, ultrasonic sensors 8 through 15 assigned to recognition device 21 must be substantially completely underwater.

It is to be noted that only one of the ultrasonic sensors 8 through 15 has to be underwater in order to enable detection of a flooding.

Figure 2:
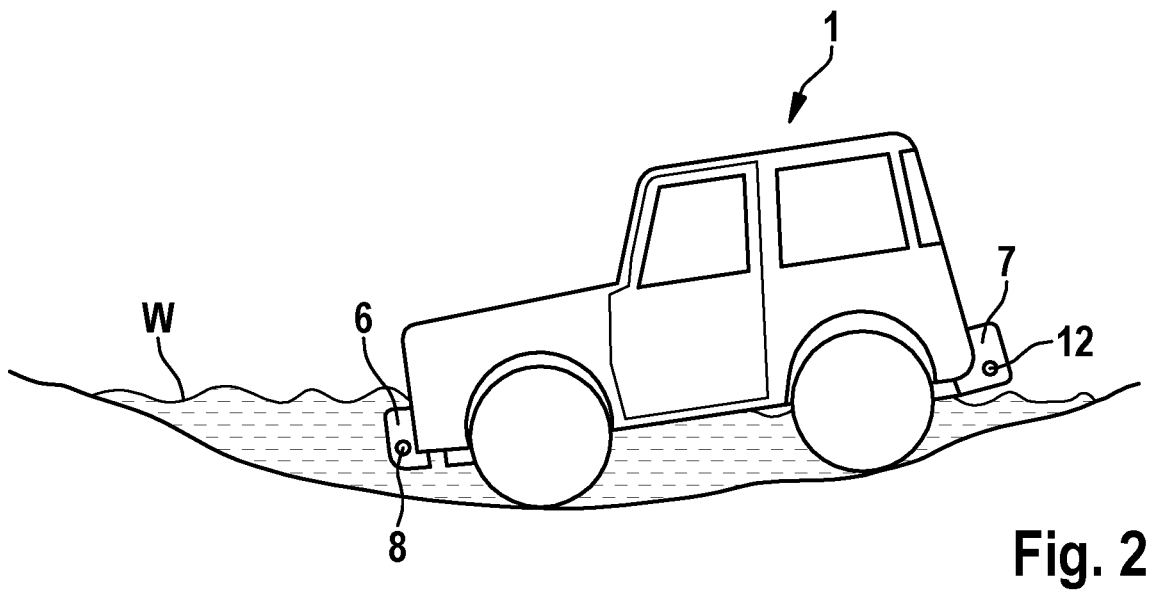
FIG. 2 shows a schematic side view of the motor vehicle with partially flooded components.

FIG. 2 shows a schematic side view of motor vehicle 1 whose front bumper 6 is situated in water, so that ultrasonic sensors 8 through 11 are also completely underwater. The water level W thus submerges front bumper 6, and thus also ultrasonic sensors 8 through 11. Because at least those ultrasonic sensors 8 through 15 that are assigned to recognition device 21 have significantly different receive signal curves in air and in water, in this regard a decision basis for recognizing a flooding can be provided that is very precise but that nonetheless can be generated easily and with low outlay.

In particular, it is also provided that in a situation such as that shown for example in FIG. 2, in which a flooding of the front region of motor vehicle 1 is recognized, a warning signal is produced by recognition device 21, and for example flap 18 is automatically closed as a result, so that no water can be suctioned into engine 16 via air duct 17. In addition, through further protective functions the entry of water at other undesired places can also be prevented.

Figure 3:
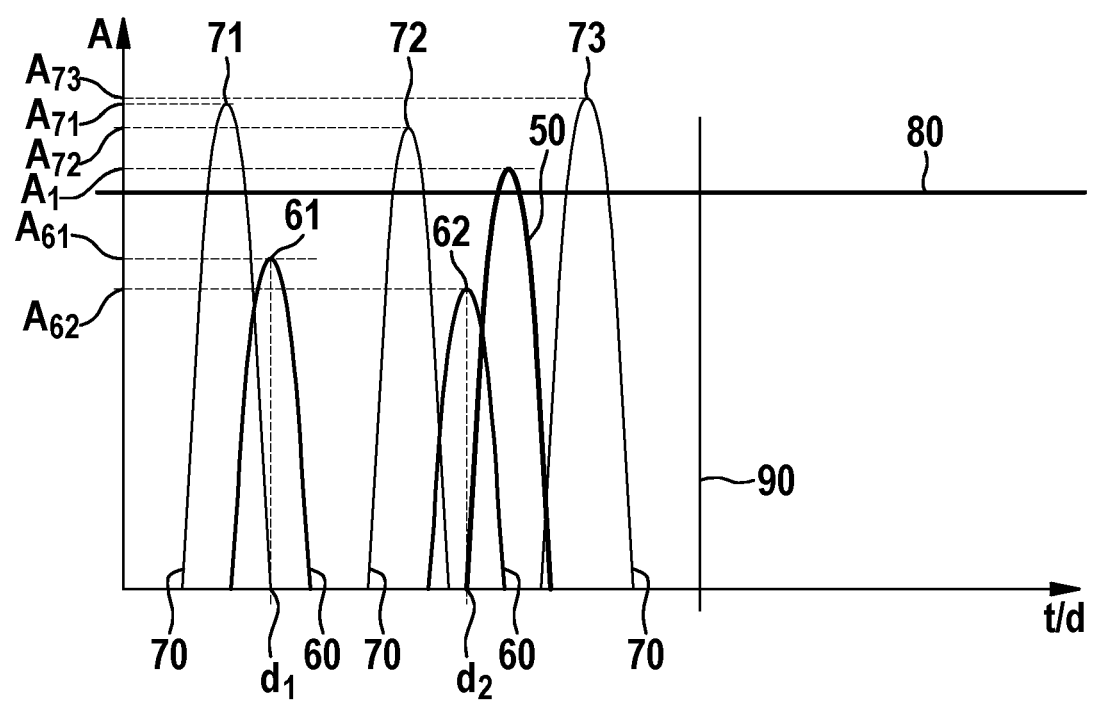
FIG. 3 schematically shows a representation of received ultrasonic signals.

FIG. 3 shows, as an example and schematically, three signal curves 50, 60, 70 of ultrasonic signals received under different circumstances by an ultrasonic sensor of a device realized according to the present invention for detecting a flooding of a motor vehicle, which are intended to explain the principle of the present invention in more detail. On the x axis, time t is plotted, which, given the known speed of sound in air, corresponds to an object distance d. Time t=0 (corresponding to a distance of d=0) here corresponds to the time of transmission of an ultrasonic signal by the ultrasonic sensor. On the y axis, a distance-normed signal amplitude is plotted. The norming can be formed for example relative to a distance-dependent amplitude of a reference object. Signals 50, 60, and 70 are received within a defined time window 90 that, given a measurement in air, corresponds to a distance of for example less than 1 meter, in particular 30-50 cm.

Signal 50 represents a received ultrasonic signal that was reflected by a concave, hard object that has a distance $d_1$ from the ultrasonic sensor and whose radius of curvature corresponds to distance $d_1$ of the object from the ultrasonic sensor.

Amplitude $A_1$ of this signal 50 is assumed as the highest possible amplitude given a signal transmission in air. On the basis of this amplitude $A_1$, a threshold value 80 can be defined that, for a given runtime t, or a distance d, corresponds approximately to the highest possible amplitude given a signal transmission in air. In the present example, threshold value 80 is selected slightly lower. Alternatively, threshold value 80 can be selected such that it corresponds to amplitude $A_1$ or is somewhat greater than amplitude $A_1$. In general, threshold value 80 can be selected as a function of the configuration and the design of the ultrasonic sensor used, and is preferably in the region of the distance-normed amplitude $A_1$.

Signal 60 is a received ultrasonic signal of the type that can occur given regular measurement in air. Signal 60 has two maxima 61 and 62, respectively having amplitudes $A_{61}$ and $A_{62}$. These signals can be for example echo signals from two objects having distances of d61 and d62. Amplitudes $A_{61}$ and $A_{62}$ are significantly smaller than $A_1$, because real objects are usually not concave having a radius of curvature corresponding to the distance, so that only a comparatively small portion of the transmitted ultrasonic signal is reflected back to the ultrasonic sensor.

Signal 70 is a received ultrasonic signal of the type that can occur given a measurement with a flooded ultrasonic sensor. Signal 70 has, in this example, three maxima 71 and 72 and 73, having the respective amplitudes $A_{71}$, $A_{72}$, and $A_{73}$. In real measurements, fewer or more maxima may also be received within defined time window 90. Each of the amplitudes $A_{71}$, $A_{72}$, and $A_{73}$ is greater than the maximum expected amplitude (at the respective associated distance) and is thus also greater than threshold value 80. According to an embodiment of the present invention, in this way it is recognized that the ultrasonic sensor was flooded at the time of reception of signal 70.

Figure 4:
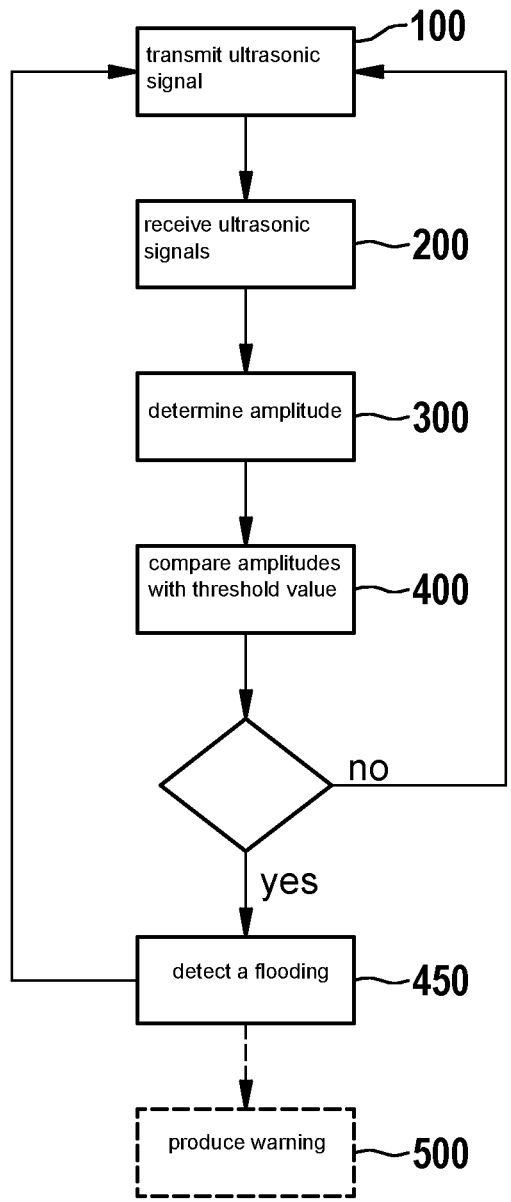
FIG. 4 shows a flow diagram of an exemplary embodiment of a method according to the present invention.

FIG. 4 shows as an example the sequence of an exemplary embodiment of a method according to the present invention.

In step 100, an ultrasonic signal is transmitted by an ultrasonic sensor of a device designed according to the present invention. In step 200, ultrasonic signals from the surrounding environment of the ultrasonic sensor are received by the ultrasonic sensor within a defined time window. In step 300, an amplitude of at least one received ultrasonic signal is determined. In step 400, the amplitudes are compared with a defined threshold value. If the comparison yields the result that a minimum number of amplitudes are greater than the defined threshold value, then in step 450 a flooding of the ultrasonic sensor is detected. The measurement cycle then begins again. In step 500, a warning signal is optionally produced if a flooding was detected. Also optionally, the warning signal is produced only if a flooding of the ultrasonic sensor is detected for at least a specified number of successive measurement cycles.

What is claimed is:

1. A device for detecting an at least partial flooding of a motor vehicle, comprising:
   an ultrasonic sensor configured to transmit and to receive ultrasonic signals; and
   an electronic recognition device configured to recognize a flooding of the ultrasonic sensor based on at least one ultrasonic signal received by the ultrasonic sensor, wherein the recognition device is configured to determine an amplitude of at least one ultrasonic signal received within a defined time window to compare the amplitude to a defined threshold value, and, as a function of a result of the comparison, to detect the flooding of the ultrasonic sensor.

2. The device as recited in claim 1, wherein the recognition device is configured to determine amplitudes of at least two maxima of an ultrasonic signal received within the defined time window, to compare the amplitudes to the defined threshold value, and, as a function of a result of the comparison, to detect the flooding, the flooding being detected when the amplitudes of two or more ultrasonic signals received within the defined time window are greater than the defined threshold value.

3. The device as recited in claim 2, wherein the defined threshold value corresponds to a maximum expected amplitude of a received ultrasonic signal that is capable of being received by the ultrasonic sensor given a measurement in air.

4. The device as recited in claim 2, wherein the defined time window corresponds to a runtime of an ultrasonic signal of the ultrasonic sensor that, given a measurement in air, corresponds to an object distance smaller than 1 meter.

5. The device as recited in claim 4, wherein the object distance is between 30 cm and 50 cm.

6. The device as recited in claim 1, wherein the ultrasonic sensor is part of an environmental acquisition system of the motor vehicle.

7. The device as recited in claim 1, wherein the ultrasonic sensor is configured to be situated on a bumper of the motor vehicle.

8. A method for detecting an at least partial flooding of a motor vehicle, the method comprising the following steps:
   transmitting and receiving ultrasonic signals by an ultrasonic sensor of the motor vehicle; and
   detecting a flooding of the ultrasonic sensor by an electronic recognition device based on at least one ultrasonic signal received by the ultrasonic sensor, the detecting including:
      determining an amplitude of at least one ultrasonic sensor received within a defined time window,
      comparing the amplitude with a defined threshold value, and
      detecting the flooding of the ultrasonic sensor as a function of a result of the comparison.

9. The method as recited in claim 8, wherein amplitudes of at least two maxima of ultrasonic signals received within the defined time window are determined, the determined amplitudes are compared to the defined threshold value, and the flooding of the ultrasonic sensor is detected as a function of a result of the comparison, a flooding being detected when the amplitudes of two or more maxima of the ultrasonic signals received within the defined time window are greater than the defined threshold value.

10. The method as recited in claim 9, wherein the defined threshold value corresponds to a maximum expected amplitude of a received ultrasonic signal that is capable of being received by the ultrasonic sensor given a measurement in air.

11. The method as recited in claim 8, wherein the defined time window corresponds to a runtime of an ultrasonic signal of the ultrasonic sensor that, given a measurement in air, corresponds to an object distance smaller than 1 meter.

12. The method as recited in claim 11, wherein thee object distance is between 30 cm and 50 cm.

13. The method as recited in claim 8, wherein in a case in which the flooding of the ultrasonic sensor is detected, a warning signal is produced.

14. The method as recited in claim 13, wherein the warning signal is produced only when the flooding is detected in at least a specified number of successive measurement cycles.

15. A motor vehicle, comprising:
   a device for detecting an at least partial flooding of the motor vehicle, including:
      an ultrasonic sensor configured to transmit and to receive ultrasonic signals, and
      an electronic recognition device configured to recognize a flooding of the ultrasonic sensor based on at least one ultrasonic signal received by the ultrasonic sensor, wherein the recognition device is configured to determine an amplitude of at least one ultrasonic signal received within a defined time window to compare the amplitude to a defined threshold value, and, as a function of a result of the comparison, to detect the flooding of the ultrasonic sensor.

16. The motor vehicle as recited in claim 15, wherein the ultrasonic sensor is situated on a bumper of the motor vehicle.

17. The motor vehicle as recited in claim 15, wherein the motor vehicle includes a multiplicity of ultrasonic sensors that have different installation heights.

* * * * *